US012209711B2

(12) United States Patent
Li et al.

(10) Patent No.: US 12,209,711 B2
(45) Date of Patent: Jan. 28, 2025

(54) FLAMMABLE AND EXPLOSIVE LIQUID TRANSPORTATION SYSTEM AND METHOD AND APPLICATION THEREOF

(71) Applicant: Sichuan Kelun Pharmaceutical Co., Ltd., Sichuan (CN)

(72) Inventors: Bo Li, Sichuan (CN); Sichuan Liu, Sichuan (CN); Wenjun Liu, Sichuan (CN); Changbin Wang, Sichuan (CN); Hongbo Tan, Sichuan (CN); Xiaoying Guo, Sichuan (CN); Liang Wang, Sichuan (CN)

(73) Assignee: Sichuan Kelun Pharmaceutical Co., Ltd., Sichuan (CN)

( * ) Notice: Subject to any disclaimer, the term of this patent is extended or adjusted under 35 U.S.C. 154(b) by 0 days.

(21) Appl. No.: 18/251,004

(22) PCT Filed: Apr. 2, 2022

(86) PCT No.: PCT/CN2022/084970
§ 371 (c)(1),
(2) Date: Apr. 28, 2023

(87) PCT Pub. No.: WO2023/050753
PCT Pub. Date: Apr. 6, 2023

(65) Prior Publication Data

US 2023/0408044 A1 Dec. 21, 2023

(30) Foreign Application Priority Data

Sep. 30, 2021 (CN) .......................... 202111157999.7

(51) Int. Cl.
*F17D 5/00* (2006.01)
*F17D 1/08* (2006.01)
*F17D 3/12* (2006.01)

(52) U.S. Cl.
CPC ............... *F17D 5/00* (2013.01); *F17D 1/086* (2013.01); *F17D 3/12* (2013.01)

(58) Field of Classification Search
CPC ............... F17D 5/00; F17D 1/086; F17D 3/12
See application file for complete search history.

(56) References Cited

U.S. PATENT DOCUMENTS

| | | | | |
|---|---|---|---|---|
| 2,979,389 A * | 4/1961 | Blount | F17D 3/12 48/190 |
| 3,018,633 A * | 1/1962 | Halliwell | F17C 11/007 222/395 |
| 2002/0090722 A1* | 7/2002 | Dominko | C12N 15/873 435/325 |

FOREIGN PATENT DOCUMENTS

| | | |
|---|---|---|
| CN | 2036216 U | 4/1989 |
| CN | 101665502 A | 3/2010 |

(Continued)

OTHER PUBLICATIONS

International Search Report, dated Jun. 28, 2022, in PCT Application No. PCT/CN2022/084970.

(Continued)

*Primary Examiner* — P. Macade Nichols
(74) *Attorney, Agent, or Firm* — SALIWANCHIK, LLOYD & EISENSCHENK

(57) ABSTRACT

The present disclosure discloses a flammable and explosive liquid transportation system and a method and an application thereof. The system includes a gas inlet pipe and a liquid transportation pipeline; a first valve and a second valve are sequentially disposed on the gas inlet pipe; two ends of the liquid transportation pipeline respectively communicate with the raw material barrel and a reaction vessel, a third valve, a fifth valve, and a seventh valve are sequentially disposed on the liquid transportation pipeline; the gas inlet pipe and the liquid transportation pipeline communicate (Continued)

with each other, and a fourth valve is disposed on the connecting pipe; a bypass pipe is disposed on the liquid transportation pipeline, and a sixth valve is disposed on the bypass pipe. The present disclosure resolves problems of a high risk and poor environmental protection caused by an existing flammable and explosive liquid transfer manner.

10 Claims, 1 Drawing Sheet

(56) References Cited

FOREIGN PATENT DOCUMENTS

| | | | |
|---|---|---|---|
| CN | 205079968 | U | 3/2016 |
| CN | 207576371 | U | 7/2018 |
| CN | 209618870 | U | 11/2019 |
| CN | 210149987 | U | 3/2020 |
| CN | 113797871 | A | 12/2021 |
| GB | 190704589 | A | 9/1907 |

OTHER PUBLICATIONS

Written Opinion dated Jun. 28, 2022 in PCT Application No. PCT/CN2022/084970.
Office Action dated Aug. 22, 2022 in Chinese Application No. 2021111579997.

* cited by examiner

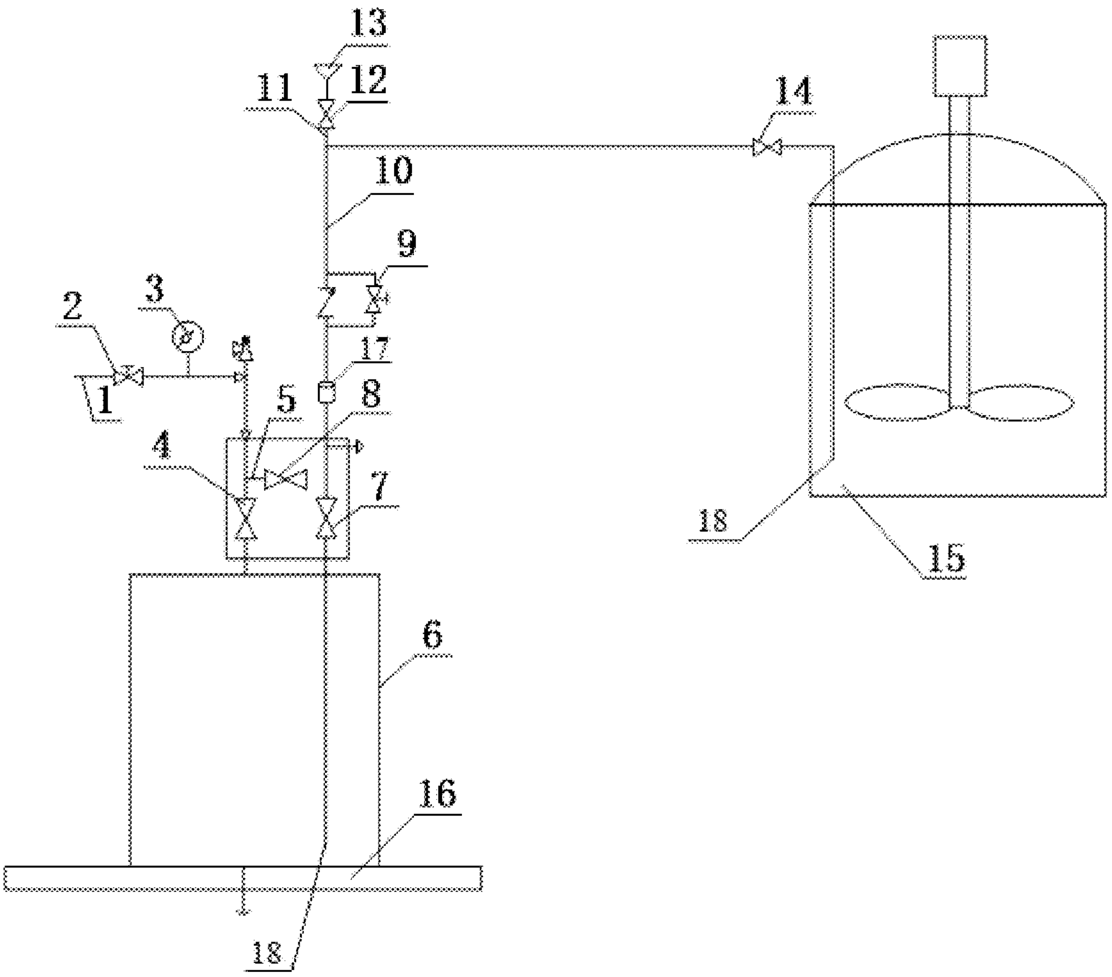
13
11
12
14
10
9
3
2
17
1
5
8
4
7
18
15
6
16
18

FLAMMABLE AND EXPLOSIVE LIQUID TRANSPORTATION SYSTEM AND METHOD AND APPLICATION THEREOF

CROSS-REFERENCE TO RELATED APPLICATIONS

This application is the U.S. national stage application of International Patent Application No. PCT/CN2022/084970, filed Apr. 2, 2022, which claims the benefit under 35 U.S.C. § 119 of Chinese Application No. 202111157999.7, filed Sep. 30, 2021, the disclosures of each of which are incorporated herein by reference in their entirety.

TECHNICAL FIELD

The present disclosure relates to the field of liquid transportation technologies, and more specifically, to a flammable and explosive liquid transportation system and a method and an application thereof.

BACKGROUND

A flammable and explosive type-A liquid may be mainly transferred in two manners. In one manner, a flammable and explosive liquid in a raw material barrel is transferred to a reaction vessel in a normal state. In the other manner, a flammable and explosive liquid in the reaction vessel is transferred to a receiving barrel in an emergency state.

The first transfer manner is applicable to replacing a manner implementation of vacuum pumping. For example, in pharmaceutical and chemical industries, the manner implementation of vacuum pumping is used, and accidents of explosion in the vacuum pumping manner emerge endlessly. Consequently, such a method is highly risky. To improve environmental protection, government departments have explicitly prohibited vacuum pumping due to a requirement for reduced emission of VOCs.

The second transfer manner is applicable to a case in which when leakage occurs at a bottom flange of a reaction kettle or vessel (for example, a header tank), explosive vapor clouds may be formed, personnel cannot approach the reaction kettle or vessel for handling, and a liquid cannot be safely and quickly transferred, causing environmental pollution and safety accidents.

SUMMARY

The present disclosure is intended to provide a flammable and explosive liquid transportation system, to resolve problems of a high risk and poor environmental protection caused by an existing flammable and explosive liquid transfer manner.

In addition, the present disclosure further provides a method and an application of the flammable and explosive liquid transportation system.

The present disclosure is implemented by the following technical solutions:

A flammable and explosive liquid transportation system includes a gas inlet pipe and a liquid transportation pipeline; wherein one end of the gas inlet pipe communicates with a raw material barrel, the other end of the gas inlet pipe communicates with an inert gas source, a first valve group is disposed on the gas inlet pipe, and the first valve group sequentially includes a first valve and a second valve along a gas flow direction;

two ends (18) of the liquid transportation pipeline respectively communicate with the raw material barrel and a reaction vessel, a second valve group is disposed on the liquid transportation pipeline, the second valve group sequentially includes a third valve, a fifth valve, and a seventh valve, and the third valve is disposed near the raw material barrel;

the gas inlet pipe and the liquid transportation pipeline communicate with each other through a connecting pipe, a fourth valve is disposed on the connecting pipe, a joint between the connecting pipe and the gas inlet pipe is disposed at a front end of the second valve, and a joint between the connecting pipe and the liquid transportation pipeline is disposed at a rear end of the third valve when a liquid is transported from the raw material barrel to the reaction vessel; a one-way valve is disposed on the liquid transportation pipeline, the one-way valve is disposed in parallel with the fifth valve, and the one-way valve only allows a liquid or a gas to enter the reaction vessel from the raw material barrel;

a bypass pipe is disposed on the liquid transportation pipeline, one end of the bypass pipe communicates with the liquid transportation pipeline, the other end of the bypass pipe communicates with a water storage container, and a sixth valve is disposed on the bypass pipe.

The system in the present disclosure can implement both transfer of a liquid from the raw material barrel to the reaction vessel and transfer of a liquid from the reaction vessel to the raw material barrel.

When the system is used to implement transfer of a liquid from the raw material barrel to the reaction vessel, the reaction vessel (reaction kettle) is first inerted by using an inert gas (for example, nitrogen), and then a material in the raw material barrel is pressurized, to transport a flammable and explosive liquid to the reaction vessel (reaction kettle), to meet both safety and environmental protection requirements and reduce accidents and emission of VOCs.

When the system is used to implement transfer of a liquid from the reaction vessel to the raw material barrel, the raw material barrel (receiving barrel) is aerated and inerted by using an inert gas (for example, nitrogen), and then a liquid in the reaction vessel (reaction kettle) is introduced into the raw material barrel (receiving barrel), to reduce a liquid level in the reaction vessel (reaction kettle), reduce leakage from a flange, and avoid formation of explosion clouds.

In conclusion, problems of a high risk and poor environmental protection caused by an existing flammable and explosive liquid transfer manner are resolved.

In one or more examples, a view mirror is disposed on the liquid transportation pipeline, and the view mirror is made of a transparent material, and is preferably made of a glass tube.

The inside of the liquid transportation pipeline can be observed through the view mirror. For example, whether the liquid transportation pipeline transports a liquid from the raw material barrel to the reaction vessel can be observed through the view mirror.

In one or more examples, the view mirror is disposed between the third valve and the fifth valve.

In one or more examples, a pressure gauge is disposed on the gas inlet pipe.

In one or more examples, one end of the liquid transportation pipeline is inserted into the bottom of the reaction vessel.

In one or more examples, the water storage container is of a funnel structure, and the bottom of the funnel structure communicates with the bypass pipe.

Disposing the funnel structure helps introduce water in the water storage container into the liquid transportation pipeline. Generally, when in use, the reaction vessel is at a high position and the raw material barrel is at a low position, and therefore, the water storage container can be placed above the raw material barrel.

In one or more examples, a weighting module is disposed at the bottom of the raw material barrel, and the weighting module may be a weight sensor, configured to meter a material in the raw material barrel.

A liquid transfer method based on a flammable and explosive liquid transportation system is provided, the method is used to transport a liquid forward in a normal state, and includes the following steps:

S1: determining that all valves are in a closed state, opening a first valve, a fourth valve, and a seventh valve, introducing an inert gas into a reaction vessel for inerting, and closing the fourth valve after sufficient inerting;

S2: opening a third valve and a second valve, introducing an inert gas into a raw material barrel for pressurization, and when a liquid enters the reaction vessel through a liquid transportation pipeline, maintaining opening of the first valve, and transporting the liquid to the reaction vessel; and S3: after the transportation of the liquid is completed, closing the third valve, opening the fourth valve, closing the second valve, and transporting a remaining liquid in the liquid transportation pipeline to the reaction vessel by using an inert gas.

The foregoing transfer method can implement transfer of a liquid from the raw material barrel to the reaction vessel. According to the transfer method in the present disclosure, the reaction vessel (reaction kettle) is first inerted by using an inert gas (for example, nitrogen), and then a material in the raw material barrel is pressurized, to transport a flammable and explosive liquid to the reaction vessel (reaction kettle), to meet both safety and environmental protection requirements and reduce accidents and emission of VOCs.

A liquid transfer method based on a flammable and explosive liquid transportation system is provided, the method is used to transport a liquid in an emergency disposal state, and includes the following steps:

step 1: determining that all valves are in a closed state, opening a second valve, slowly opening a first valve, and introducing an inert gas into a raw material barrel for sufficient inerting;

step 2: opening a fifth valve and a sixth valve, and filling a liquid transportation pipeline with water by using a water storage container; and step 3: closing the sixth valve, opening a third valve and a seventh valve, and transferring a liquid in a reaction vessel to the raw material barrel through siphoning.

The foregoing transfer method can implement transfer of a liquid from the reaction vessel to the raw material barrel. According to the transfer method in the present disclosure, the raw material barrel (receiving barrel) is aerated and inerted by using an inert gas (for example, nitrogen), and then a liquid in the reaction vessel (reaction kettle) is introduced into the raw material barrel (receiving barrel), to reduce a liquid level in the reaction vessel (reaction kettle), reduce leakage from a flange, and avoid formation of explosion clouds.

An application of a flammable and explosive liquid transportation system is provided, the system is used for flammable and explosive liquid transfer, and the flammable and explosive liquid transfer includes transfer of a liquid from a raw material barrel to a reaction vessel and transfer of a liquid from the reaction vessel to the raw material barrel.

Compared with the prior art, the present disclosure has the following advantages and benefits:

1. The system in the present disclosure can implement both transfer of a liquid from the raw material barrel to the reaction vessel and transfer of a liquid from the reaction vessel to the raw material barrel.
2. When the system in the present disclosure is used for liquid transfer, both safety and environmental protection are considered while the operation is simple.

BRIEF DESCRIPTION OF DRAWINGS

The accompanying drawings illustrated herein are provided to provide a further understanding of embodiments of the present disclosure, and constitute a part of this application but are not construed as limiting embodiments of the present disclosure. In the drawings:

FIG. 1 is a schematic diagram of a structure of a system according to the present disclosure.

DETAILED DESCRIPTION

To make the objectives, technical solutions, and advantages of the present disclosure clearer, the present disclosure will be further described in detail with reference to embodiments and drawings. Exemplary implementations of the present disclosure together with description thereof are intended to explain the present disclosure, and are not to be construed as limiting the present disclosure.

Example

FIG. 1 shows a flammable and explosive liquid transportation system. The system includes a gas inlet pipe 1 and a liquid transportation pipeline 10;

one end of the gas inlet pipe 1 communicates with a raw material barrel 6, the other end of the gas inlet pipe 1 communicates with an inert gas source, and a first valve 2 and a second valve 4 are sequentially disposed on the gas inlet pipe 1 along a gas flow direction;

two ends (18) of the liquid transportation pipeline 10 respectively communicate with the raw material barrel 6 and a reaction vessel 15, one end of the liquid transportation pipeline 10 is inserted into the bottom of the reaction vessel 15, a third valve 7, a fifth valve 9, and a seventh valve 14 are sequentially disposed on the liquid transportation pipeline 10, and the third valve 7 is disposed near the raw material barrel 6;

the gas inlet pipe 1 and the liquid transportation pipeline 10 communicate with each other through a connecting pipe 5, a fourth valve 8 is disposed on the connecting pipe 5, a joint between the connecting pipe 5 and the gas inlet pipe 1 is disposed at a front end of the second valve 4, and a joint between the connecting pipe 5 and the liquid transportation pipeline 10 is disposed at a rear end of the third valve 7 when a liquid is transported from the raw material barrel 6 to the reaction vessel 15. A one-way valve is disposed on the liquid transportation pipeline 10, the one-way valve is disposed in parallel with the fifth valve 9, and the one-way valve only allows a liquid or a gas to enter the reaction vessel

15 from the raw material barrel 6. The one-way valve can inhibit a liquid in the liquid transportation pipeline 10 from flowing back due to sudden interruption of an inert gas;

a bypass pipe 11 is disposed on the liquid transportation pipeline 10, one end of the bypass pipe 11 communicates with the liquid transportation pipeline 10, the other end of the bypass pipe 11 communicates with a water storage container 13, and a sixth valve 12 is disposed on the bypass pipe 11.

In this example, a view mirror 17 is disposed on the liquid transportation pipeline 10, and the view mirror 17 is made of a transparent material. The view mirror 17 is disposed between the third valve 7 and the fifth valve 9. A ground cable is disposed between the view mirror 17 and the third valve 7.

In this example, a pressure gauge 3 and a safety valve are disposed on the gas inlet pipe 1. The water storage container 13 is of a funnel structure, and the bottom of the funnel structure communicates with the bypass pipe 11.

In this example, a weighting module 16 is disposed at the bottom of the raw material barrel 6.

The system in this embodiment can implement both transfer of a liquid from the raw material barrel 6 to the reaction vessel 15 and transfer of a liquid from the reaction vessel 15 to the raw material barrel 6.

When the system is used to transport a liquid forward in a normal state (from the raw material barrel 6 to the reaction vessel 15), the following steps are included:

S1: determining that all valves are in a closed state, opening the first valve 2, adjusting the first valve 2 to required pressure based on the pressure gauge 3, opening the fourth valve 8 and the seventh valve 14, introducing an inert gas into the reaction vessel 15 for inerting, and closing the fourth valve 8 after sufficient inerting;

S2: opening the third valve 7 and the second valve 4, introducing an inert gas into the raw material barrel 6 for pressurization, and when a liquid enters the reaction vessel 15 through the liquid transportation pipeline 10, maintaining opening of the first valve 2, and transporting the liquid to the reaction vessel 15; and S3: after the transportation of the liquid is completed, closing the third valve 7, opening the fourth valve 8, closing the second valve 4, transporting a remaining liquid in the liquid transportation pipeline 10 to the reaction vessel 15 by using an inert gas, and closing all the valves after it is determined, based on the weighting module 16, that a required mass of the transported liquid is reached.

When the system is used to reversely transport a liquid in an emergency disposal state (to transfer the liquid from the reaction vessel 15 to the raw material barrel 6), the following steps are included:

step 1: determining that all valves are in a closed state, opening the second valve 4, slowly opening the first valve 2 based on the pressure gauge 3, and introducing an inert gas into the raw material barrel 6 for sufficient inerting;

step 2: opening the fifth valve 9 and the sixth valve 12, and filling the liquid transportation pipeline 10 with water by using the water storage container 13; and step 3: closing the sixth valve 12, opening the third valve 7 and the seventh valve 14, transferring a liquid in the reaction vessel 15 to the raw material barrel 6 through siphoning, and closing all the valves after the step ends.

In the foregoing specific implementations, the objective, technical solutions, and benefits of the present disclosure are further described in detail. It should be understood that the descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A flammable and explosive liquid transportation system, comprising a gas inlet pipe (1) and a liquid transportation pipeline (10), wherein one end of the gas inlet pipe (1) communicates with a raw material barrel (6), the other end of the gas inlet pipe (1) communicates with an inert gas source, a first valve group is disposed on the gas inlet pipe (1), and the first valve group sequentially comprises a first valve (2) and a second valve (4) along a gas flow direction;

two ends (18) of the liquid transportation pipeline (10) respectively communicate with the raw material barrel (6) and a reaction vessel (15), a second valve group is disposed on the liquid transportation pipeline (10), the second valve group sequentially comprises a third valve (7), a fifth valve (9), and a seventh valve (14), the third valve (7) is disposed near the raw material barrel (6), a one-way valve is disposed on the liquid transportation pipeline (10), the one-way valve is disposed in parallel with the fifth valve (9), and the one-way valve only allows a liquid or a gas to enter the reaction vessel (15) from the raw material barrel (6);

the gas inlet pipe (1) and the liquid transportation pipeline (10) communicate with each other through a connecting pipe (5), a fourth valve (8) is disposed on the connecting pipe (5), a joint between the connecting pipe (5) and the gas inlet pipe (1) is disposed at a front end of the second valve (4), and a joint between the connecting pipe (5) and the liquid transportation pipeline (10) is disposed at a rear end of the third valve (7) when a liquid is transported from the raw material barrel (6) to the reaction vessel (15); and a bypass pipe (11) is disposed on the liquid transportation pipeline (10), one end of the bypass pipe (11) communicates with the liquid transportation pipeline (10), the other end of the bypass pipe (11) communicates with a water storage container (13), and a sixth valve (12) is disposed on the bypass pipe (11).

2. The flammable and explosive liquid transportation system according to claim 1, wherein a view mirror (17) is disposed on the liquid transportation pipeline (10), and the view mirror (17) is made of transparent material.

3. The flammable and explosive liquid transportation system according to claim 2, wherein the view mirror (17) is disposed between the third valve (7) and the fifth valve (9).

4. The flammable and explosive liquid transportation system according to claim 1, wherein a pressure gauge (3) and a safety valve are disposed on the gas inlet pipe (1).

5. The flammable and explosive liquid transportation system according to claim 1, wherein one end of the liquid transportation pipeline (10) is inserted into a bottom of the reaction vessel (15).

6. The flammable and explosive liquid transportation system according to claim 1, wherein the water storage container (13) is of a funnel structure, and a bottom of the funnel structure communicates with the bypass pipe (11).

7. The flammable and explosive liquid transportation system according to claim 1, wherein a weighting module (16) is disposed at a bottom of the raw material barrel (6).

8. A liquid transfer method based on the flammable and explosive liquid transportation system according to claim 1, used to transport a liquid forward in a normal state, and comprising the following steps:

S1: determining that all valves are in a closed state, opening the first valve (2), the fourth valve (8), and the seventh valve (14), introducing an inert gas into the reaction vessel (15) for inerting, and closing the fourth valve (8) after sufficient inerting;

S2: opening the third valve (7) and the second valve (4), introducing an inert gas into the raw material barrel (6) for pressurization, and when a liquid enters the reaction vessel (15) through the liquid transportation pipeline (10), maintaining opening of the first valve (2), and transporting the liquid to the reaction vessel (15); and S3: after the transportation of the liquid is completed, closing the third valve (7), opening the fourth valve (8), closing the second valve (4), and transporting a remaining liquid in the liquid transportation pipeline (10) to the reaction vessel (15) by using an inert gas.

9. The liquid transfer method claim 8, wherein the liquid transfer method is used to reversely transport a liquid in an emergency disposal state, and comprises the following steps:

step 1: determining that all valves are in a closed state, opening the second valve (4), slowly opening the first valve (2), and introducing an inert gas into the raw material barrel (6) for sufficient inerting;

step 2: opening the fifth valve (9) and the sixth valve (12), and filling the liquid transportation pipeline (10) with water by using the water storage container (13); and step 3: closing the sixth valve (12), opening the third valve (7) and the seventh valve (14), and transferring the liquid in a reaction vessel (15) to the raw material barrel (6) through siphoning.

10. A method of using the flammable and explosive liquid transportation system according to claim 1 for flammable or explosive liquid transfer, wherein the flammable or explosive liquid transfer comprises: obtaining the flammable and explosive liquid transportation system of claim 1; transferring liquid from the raw material barrel (6) to the reaction vessel (15); and transferring liquid from the reaction vessel (15) to the raw material barrel (6).

* * * * *